United States Patent [19]

Bastian et al.

[11] Patent Number: 5,258,198

[45] Date of Patent: Nov. 2, 1993

[54] PROCESS FOR MAKING PEPPER KRAUT

[75] Inventors: Catherine Bastian, 27745 Newport, Warren, Mich. 48093; Thomas Bastian, Warren, Mich.

[73] Assignee: Catherine Bastian, Warren, Mich.

[21] Appl. No.: 829,751

[22] Filed: Feb. 28, 1992

[51] Int. Cl.⁵ .............................................. A23B 7/08
[52] U.S. Cl. ..................................... 426/615; 426/639
[58] Field of Search ................................ 426/615, 639

[56] References Cited

U.S. PATENT DOCUMENTS

| | | | |
|---|---|---|---|
| 4,614,655 | 9/1986 | Hashino | 426/615 |
| 4,828,848 | 5/1989 | Owades | 426/615 |
| 4,844,929 | 7/1989 | Kingsley | 426/615 |

OTHER PUBLICATIONS

Ziemann 1929 The White House Cookbook The Saalfield Publishing Co. Akron Ohio pp. 204-205.

The Gourmet Cookbook 1950 Kingsport Press Inc. Kingsport Tenn. p. 483.

Complete Guide to Home Canning, Preserving & Freezing 1973 Dover Publications Inc. New York (21)111-(24)114.

*Primary Examiner*—Carolyn Paden
*Attorney, Agent, or Firm*—Catherine Bastian

[57] ABSTRACT

The previously stated specification is an indepth description of my invention. This product offers an appeal by its natural color and ingredients. There are three distinct flavor sensations the consumer will experience, sweet, sour, and the natural spicy flavor of a garden grown pepper. The product consists of Hungarian and Romanian Wax Peppers, cored and de-seeded and stuffed with a sauerkraut mixture and immersed in a brine with dill weed immediately reacting with the chemistry of the vegetables themselves; thus, allowing an instant flavor impregnation so that no formal canning procedure (unlike that contained in the "Pickled Green Pepper", by Hugo Ziemann) is required to achieve the taste. The product is currently canned in a one quart glass jar, but is not necessarily restricted to that particular size of container.

1 Claim, No Drawings

PROCESS FOR MAKING PEPPER KRAUT

SUMMARY OF INVENTION

Our invention is a consummable food product titled by me as Pepper-Kraut. This product consists of canned Hungarian and/or Romanian Wax Peppers that are cored, deseeded and stuffed with a sauer-kraut mixture, and immersed in a brine type canning solution with dill weed causing a sweet and sour taste. The product is contained in a standard one quart glass jar.

DETAILED DESCRIPTION a. Active/Physical Ingredients

1. Hungarian Wax Peppers and or Romanian Wax Peppers, five to six inches average length.
2. Sauerkraut—Commercially available, no specific brand name.
3. White Vinegar—Commercially available with a five percent (5%) acidity content, no specific brand name.
4. White Granulated Sugar—Commercially available, no specific brand name.
5. Dill Weed Stalks—Commercially available, no specific brand name.
6. Common Tap Water
7. Kosher Canning Salt—Commercially available, no specific brand name.
8. Dried, Ground Dill—Commercially available, no specific brand name.

b. Preparation Process: (For Peppers and Sauerkraut)

What claim is the process of combining the above stated

1. STEP 1: Hand select large Hungarian and/or Romanian Hot peppers (five to six inches long) of seasoned colors (red, green, yellow, orange). Wash the peppers, cut off the tops, decore, remove the seeds, rinse and set aside.
2. STEP 2: Drain a 28 oz. can of commercially available Sauerkraut (no specific brand name) and set aside.
3. STEP 3: Using the prepared peppers (de-cored and de-seeded) from step 1, stuff the peppers firmly to the top with the drained sauerkraut from Step 2.
4. STEP 4: Wash using cold common tap water one (1) large bunch of fresh Dill with flower tops and shake off excess water, set aside.
5. STEP 5: Using common dish detergent and hot tap water, thoroughly wash a one (1) quart glass canning jar. Rinse with cold tap water and set aside to drain dry.
6. STEP 6: In the washed and clean jar add one (1) teaspoon (tsp) of Kosher canning salt.
7. STEP 7: Cut and separate the large bunch of fresh Dill, then add two (2) whole stems of fresh dill snippings with flower tops into the one quart glass jar.
8. STEP 8: Add to the one quart jar, one-half (½) teaspoon of ground, dried Dill.
9. STEP 9: Place the six (previously prepared) peppers stuffed with the sauerkraut in the jar with the stuffed open ends facing up.

c. Preparation Process: Brine Solution

10. STEP 10: The brine solution is made by stirring into a large saucepan, 2 cups of white vinegar (5% acidity), 2 cups white granulated sugar and allow mixture to come to a full rapid boil. Remove from heat.
11. STEP 11: Pour the prepared brine solution over the stuffed peppers in the quart jar until peppers are completely immersed in the solution.
12. STEP 12: Place a new canning ring and lid over the one quart jar and tighten securely.
13. STEP 13: There are two available options for the preservation of this product:
    a. The first is to simply refrigerate the sealed jars once they have reached room temperature.
    b. The second process is for extended storage at room temperature, this process is to follow common canning procedures.

We claim:

1. A method for preparing pepper-kraut comprising:
   a. Selecting large Hungarian/romanian hot peppers of seasonal colors
   b. Preparing the peppers for stuffing by washing the peppers, cutting off their tops, extracting the seeds and rinsing the cut, de-seeded pepper
   c. Stuffing the prepared peppers with sauerkraut
   d. Placing the stuffed prepared peppers in a clean quart glass canning jar, said canning jar containing one teaspoon of Kosher canning salt and cut fresh dill
   e. Adding a brine solution to the filled quart glass canning jar to completely immerse the stuffed pepper, said brine being prepared by boiling and mixing two cups of white vinegar, one cup of water and two cups of granulated sugar
   f. Preserving the product by refrigeration or by heating the prepared jars in a hot water bath at 165° F. for ten minutes and allowing the processed jar to cool for storage to obtain a preserved sweet and sour pepper kraut product.

* * * * *